(12) United States Patent
Jansson

(10) Patent No.: US 7,901,161 B2
(45) Date of Patent: Mar. 8, 2011

(54) CUTTING INSERT AND TOOL FOR CHIP REMOVING MACHINING

(75) Inventor: Mikael Jansson, Avesta (SE)

(73) Assignee: Seco Tools AB, Fagersta (SE)

( * ) Notice: Subject to any disclaimer, the term of this patent is extended or adjusted under 35 U.S.C. 154(b) by 359 days.

(21) Appl. No.: 12/326,719

(22) Filed: Dec. 2, 2008

(65) Prior Publication Data

US 2009/0155005 A1 Jun. 18, 2009

(30) Foreign Application Priority Data

Dec. 13, 2007 (SE) ....................... 0702766

(51) Int. Cl.
*B23B 27/22* (2006.01)
*B26D 1/00* (2006.01)
(52) U.S. Cl. .......................... 407/113; 407/114
(58) Field of Classification Search .............. 407/113, 407/114, 115, 116
See application file for complete search history.

(56) References Cited

U.S. PATENT DOCUMENTS

| 3,540,102 | A | * | 11/1970 | Yogus et al. | 407/104 |
| 4,681,486 | A | * | 7/1987 | Hale | 407/114 |
| 5,505,569 | A | * | 4/1996 | Gustafsson et al. | 407/113 |
| 6,224,300 | B1 | * | 5/2001 | Baxivanelis et al. | 407/114 |
| 7,645,100 | B2 | * | 1/2010 | Andersson et al. | 407/66 |
| 2005/0063792 | A1 | | 3/2005 | Satran | |
| 2008/0152440 | A1 | * | 6/2008 | Andersson et al. | 407/103 |

FOREIGN PATENT DOCUMENTS

| DE | 280485 A1 | 7/1990 |
| EP | 1749602 A2 | 2/2007 |
| WO | 2007149035 A1 | 12/2007 |

OTHER PUBLICATIONS

International Search Report for corresponding International Application PCT/SE2008/051391.

* cited by examiner

*Primary Examiner* — Will Fridie, Jr.
(74) *Attorney, Agent, or Firm* — WRB-IP LLP

(57) ABSTRACT

An indexable milling insert having triangular shape, the cutting insert comprising a mounting hole placed centrally in the cutting insert, a first support surface and a second support surface, which support surfaces are parallel with each other and act as alternating support surfaces, that the cutting insert comprises three equally long sides, which extend between the parallel support surfaces, that the cutting insert is provided with main cutting edges, which are orientated perpendicularly to the center axis of the mounting hole as well as provided in such a way that a rotation of the cutting insert around the center of the mounting hole to an alternative insert seat alternatively a turning of the cutting insert to an alternative insert seat provides an identical location of the main cutting edges in relation to a piece to be machined, and that the wedge angles (β) of the cutting insert are in the range of $70° \leq \beta \leq 85°$. The invention also relates to a milling tool equipped with the milling inserts defined above. The cutting insert comprises planar support surfaces situated on the sides, and the support surfaces in the respective sides form mutual angles of 60°.

17 Claims, 4 Drawing Sheets

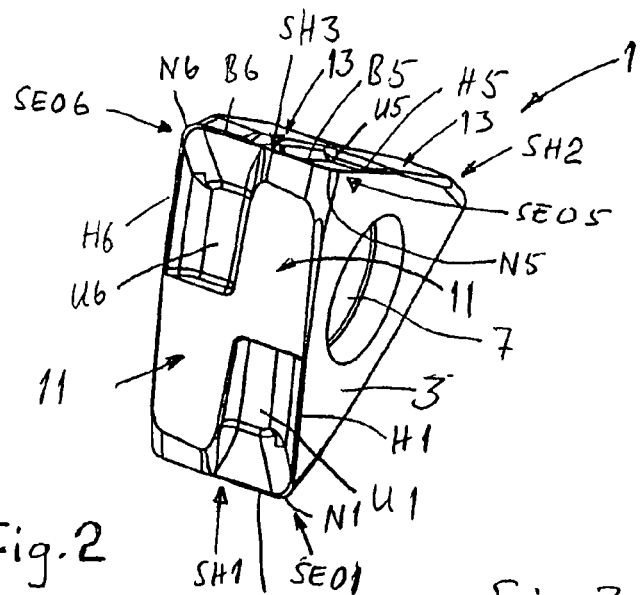
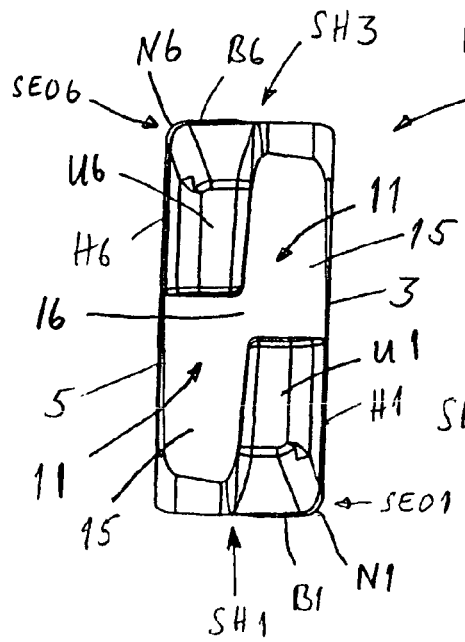
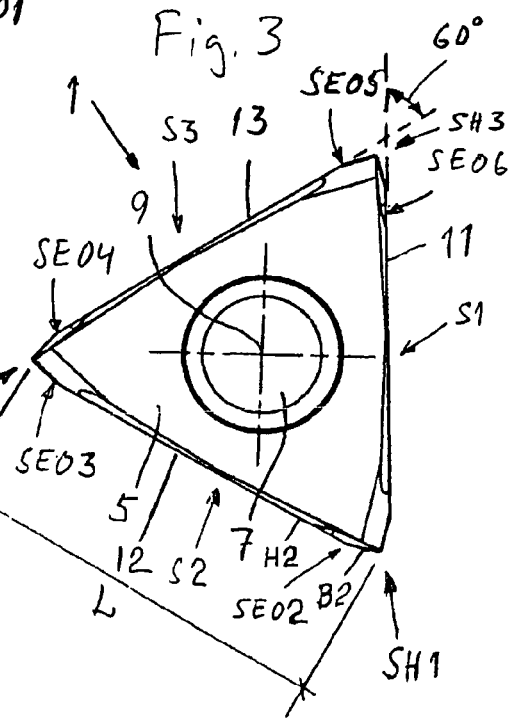

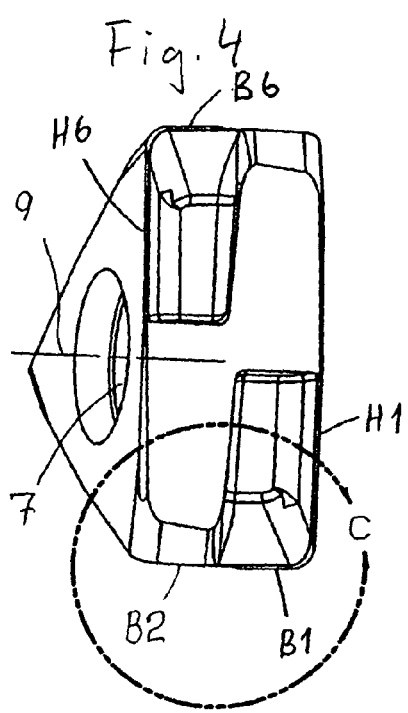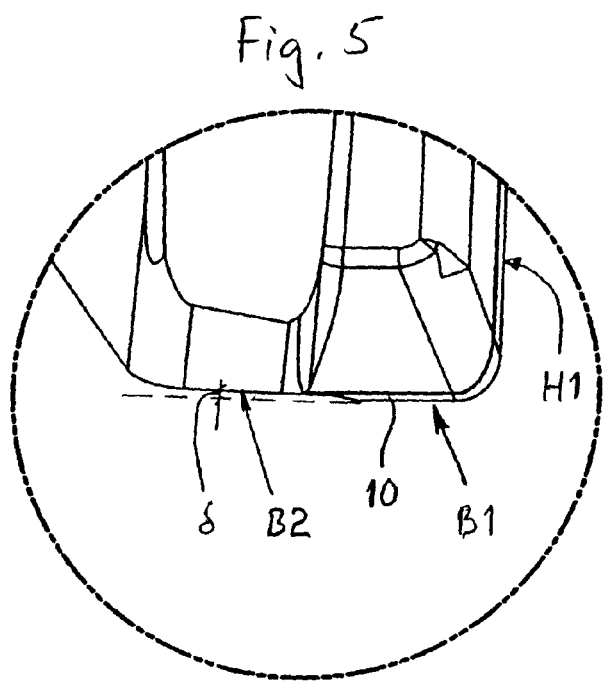

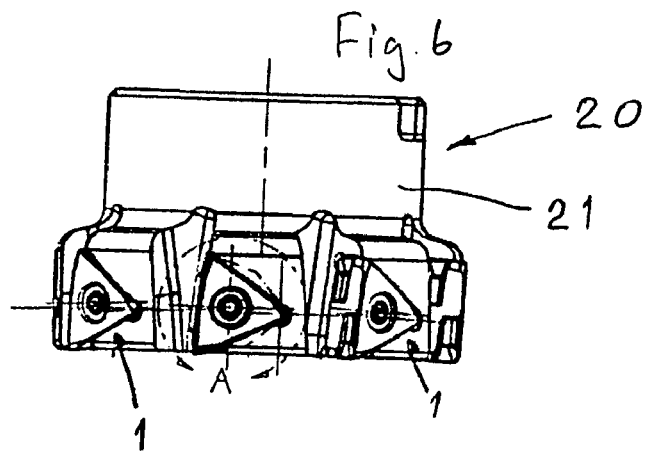
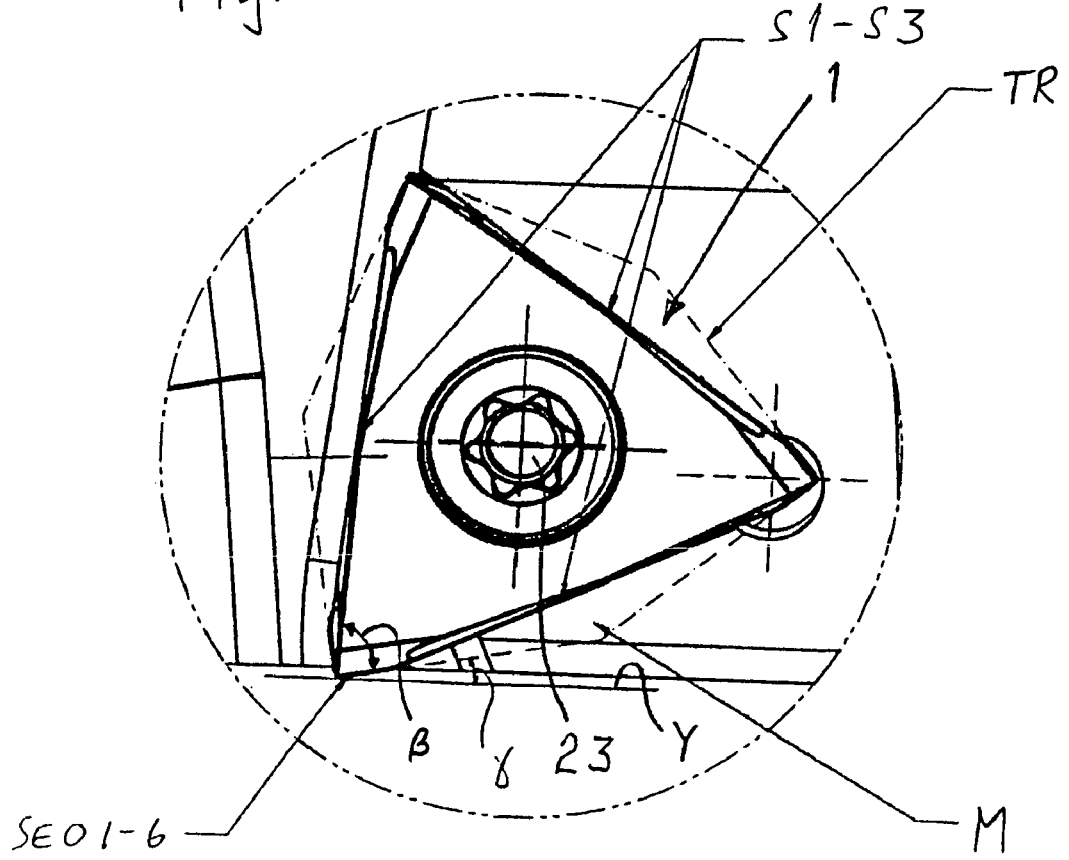

US 7,901,161 B2

CUTTING INSERT AND TOOL FOR CHIP REMOVING MACHINING

BACKGROUND AND SUMMARY

The present invention relates to the area of chip removing machining and then especially to a milling insert and a milling tool. The milling insert is indexably mounted in the milling tool. The milling tool is an end mill having 90° setting angle.

Upon tangential mounting of trigon inserts in a milling body as in applicants WO2007149035, the insert seats formed in the milling body of the milling tool have a trigon shape adapted to the cutting insert, as seen in planar view of the insert seat. The trigon shape of the insert seats entails that certain of the flanks of the milling body that surround the cutting insert comprise relatively little material, i.e., the flanks become weak as for carrying the loads.

So-called triangular cutting inserts are generally known. A disadvantage of these cutting inserts is that they have weak cutting corners.

It is desirable to provide a cutting insert and a tool for chip removing machining of the kind defined by way of introduction, the critical flanks of the milling body not being weakened in comparison with prior tools.

It is also desirable to provide the cutting insert with a maximum number of cutting edge areas, in this case the number of areas being six.

It is also desirable to improve the mutual support function between the cutting insert and the insert seal formed in the milling body.

It is also desirable that the cutting insert is given such a positioning in the cutting body that the cutting insert does not interfere with the machined surface that is obtained during milling using the tool according to the present invention.

According to an aspect of the present invention, an indexable milling insert having triangular shape is provided, the cutting insert comprising a mounting hole placed centrally in the cutting insert, a first support surface and a second support surface, which support surfaces are parallel with each other and act as alternating support surfaces, that the cutting insert comprises three equally long sides, which extend between the parallel support surfaces, that the cutting insert is provided with main cutting edges, which are orientated perpendicularly to the center axis of the mounting hole as well as provided in such a way that a rotation of the cutting insert around the center of the mounting hole to an alternative insert seal alternatively a turning of the cutting insert to an alternative insert seat provides an identical location of the main cutting edges in relation to a piece to be machined, and that the wedge angles ($\beta$) of the cutting insert are in the range of $70° \leq \beta \leq 85°$, wherein the cutting insert comprises planar support surfaces situated on the sides, and that the support surfaces in the respective sides form mutual angles of 60°.

According to another aspect of the present invention, a milling tool comprises a milling body having a plurality of insert seats, wherein each insert seat is configured to receive a milling insert as described above so that the milling inserts are tangentially mounted in the milling body.

BRIEF DESCRIPTION OF THE DRAWINGS

Below a preferred embodiment of the invention will be described, reference being made to the accompanying drawings, where:

FIG. 1 shows a perspective view of a cutting insert according to the present invention;

FIG. 2 shows a side view of the cutting insert according to FIG. 1;

FIG. 3 shows a planar view of the cutting insert according to FIG. 1;

FIG. 4 shows an additional perspective view of the cutting insert according to FIG. 1;

FIG. 5 shows an enlargement of the dash-dotted circle C in FIG. 4;

FIG. 6 shows a side view of a milling tool according to the present invention, which is provided with cutting inserts according to the present invention;

FIG. 7 shows an enlargement of the dash-dotted circle A in FIG. 6; and

DETAILED DESCRIPTION

Figure 8:
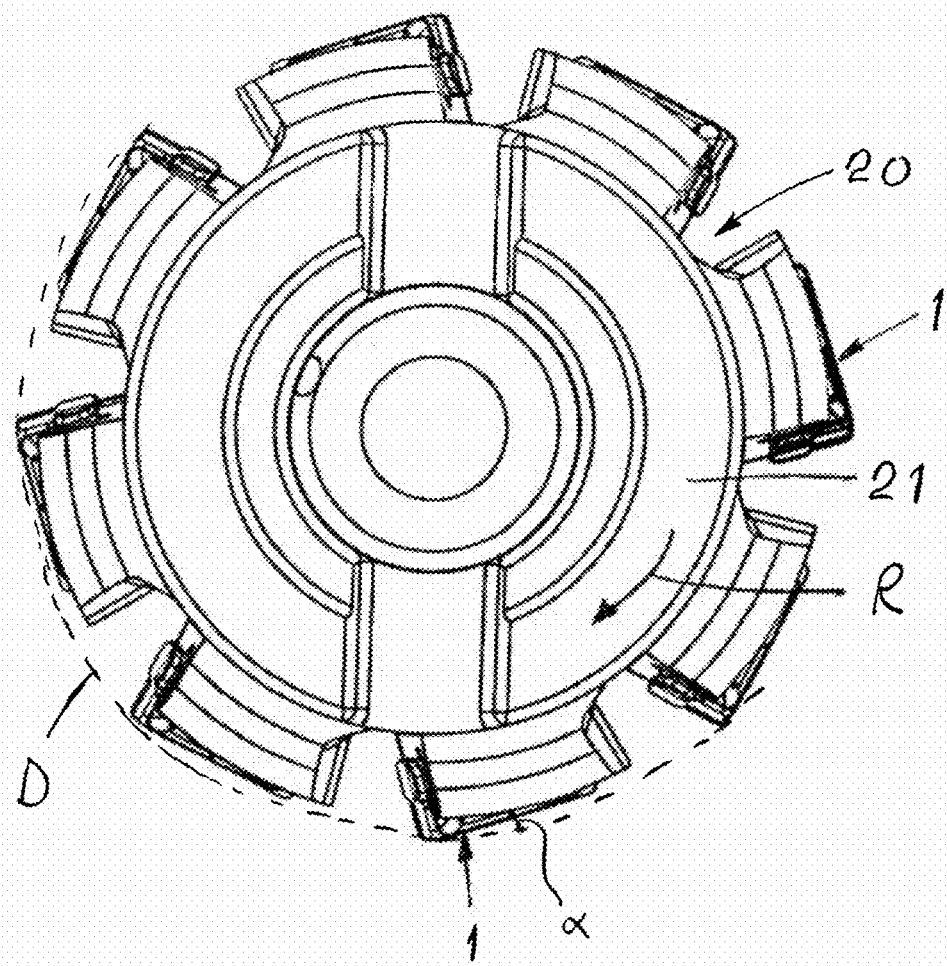
FIG. 8 shows a planar view of the milling tool according to FIG. 6.

The cutting insert 1 according to the present invention shown in FIGS. 1-3 constitutes a milling insert, which is double-sided or indexable. The cutting insert has a triangular basic shape and is manufactured from pressed or injection moulded cemented carbide. With "cemented carbide" reference is here made to WC, TiC, TaC, NbC etc., in sintered combination with a binder metal, such as, for instance, Co or Ni. The cutting insert 1 is preferably at least partly covered with a layer of, e.g., Al2O3, TiN and/or TiCN. In certain cases, it may be justified that the cutting edges consist of soldered superhard materials such as CBN or PCD.

As is seen in FIG. 3, the cutting insert 1 has in planar view a generally triangular shape. The cutting insert 1 comprises three sides S1, S2 and S3 presenting three cutting corners SH1, SH2 and SH3 at intersections of the sides. The length of the side S2 has been designated L in FIG. 3 and the other sides S1 and S3 have the corresponding length. The cutting insert 1 also comprises a first support surface 3, which connects to the three sides S1-S3 of the cutting insert 1. Correspondingly, the cutting insert 1 has a second support surface 5, which is parallel with the first support surface 3, and also connects to the three sides S1-S3 of the cutting insert 1. For mounting the cutting insert 1 in an insert seat of a milling body, the cutting insert 1 is provided with a mounting hole 7, which is provided centrally in the cutting insert 1. The mounting hole 7 penetrates both the first support surface 3 and the second support surface 5. The center axis of the mounting hole 7 has been given the reference designation 9. The first and second support surfaces 3, 5 have essentially the shape of an equilateral triangle.

The cutting insert according to the present invention has six (6) cutting edge areas SEO1, SEO2, SEO3, SEO4, SEO5, SEO6, i.e., two for each cutting corner SH1, SH2, SH3. Each cutting edge area SEO1-SEO6 has a main cutting edge H1, H2, H3, H4, H5, H6 as well as a minor cutting edge B1, B2, B3, B4, B5, B6. Three of the main cutting edges H1, H3, H5 are situated adjacent to the first support surface 3 while the three other main cutting edges H2, H4, H6 are situated adjacent to the second support surface 5.

The main cutting edges H1-H6 and associated minor cutting edges B1-B6 are connected by means of nose cutting edges N1, N2, N3, N4, N5, N6, the first nose cutting edge N1, the filth nose cutting edge N5 and the sixth nose cutting edge N6 of which being shown in FIGS. 1 and 2.

Each one of the minor cutting edges B1-B6 are provided with a chamfer 10, see FIGS. 4 and 5, where the chamfer 10 of the minor cutting edge B1 is shown, the chamfer 10 of the minor cutting edge B1 essentially being situated in the plane of the paper in FIG. 5, while the corresponding chamfer of the adjacent minor cutting edge B2 extends transversely to the plane of the paper in FIG. 5. In this connection, it should be pointed out that FIG. 4 shows the milling insert 1 in a position, which corresponds to the mounted position of the milling tool, see FIGS. 6 and 7. This entails that in the perspective view of the cutting insert 1 according to the present invention shown in FIG. 4, the minor cutting edge B2 situated next to the minor cutting edge B1 will be positioned on a higher level than the minor cutting edge B1 in the position of the cutting insert 1 shown in FIG. 4. This level difference is illustrated by means of the measure "δ" in FIG. 5. Normally, the measure δ is in the order of 0.05 mm. The main cutting edge H1 and the minor cutting edge B1 are the active cutting edges, while the adjacent minor cutting edge B2 is inactive by the level difference described above.

To each main cutting edge H1-H6 and minor cutting edge B1-B6, a chip breaking countersunk recess U1, U2, U3, U4, U5, U6 connects, the first U1, the fifth U5, the sixth U6 of which recesses are shown in FIGS. 1 and 2. These recesses U1-U6 are countersunk in relation to the cutting edges and give the cutting edges a positive rake angle in order to easily cut in a piece to be machined. Each recess U1-U6 extends to about half of the cutting insert thickness.

Each side S1-S3 is provided with a support surface, the side S1 being provided with a third support surface 11, the side S2 being provided with a fourth support surface 12 and the side S3 being provided with a fifth support surface 13. The third, fourth and fifth support surfaces 11-13 are planar and extend along the major part of the length L of the sides S1-S3. Such as most clearly is seen in FIGS. 1 and 2, the third support surface 11 is generally composed of two elongate pan surfaces 15, which have an extension/length that approximately corresponds to half the length of the sides S1-S3 of the culling insert 1. The part surfaces 15 are interconnected by means of a connection portion 16. The part surfaces 15 are situated in a common plane, i.e., they form together with the connection portion 16 a continuous, planar support surface 11, which extends along the major part of the side length L of the cutting insert 1. The corresponding applies to the fourth and fifth support surfaces 12 and 13. The third, fourth and fifth support surfaces 11-13 mutually form angles of 60°, i.e., the corresponding angles as of an isosceles triangle. This is illustrated in FIG. 3, where the angle of 60° is marked between the support surfaces 11 and 13.

In FIGS. 6 and 8, a milling tool 20 according to the present invention is shown, the milling tool comprising a number of milling inserts 1 according to the present invention. The milling inserts 1 are generally tangentially mounted in a milling body 21 of the milling tool 20, i.e. the cutting inserts have hole axes extending substantially radially. The arrow R in FIG. 8 indicates the direction of rotation of the milling tool 20.

In FIG. 8, a dashed circle D is drawn, said circle D indicating the active cutting diameter of the milling tool 20. In FIG. 8, it is seen that the cutting inserts 1 are mounted in such a way in the milling body that the inactive support surface facing outward of the cutting inserts 1 obtains a certain clearance in relation to the circle D, a first clearance angle being marked using α in FIG. 8. The first clearance angle α is normally in the range of 1°-10°, preferably in the range of 5°-7°.

In FIG. 7, an enlarged detail of FIG. 6 is shown and more precisely a cutting insert 1, mounted in an insert seat of the milling body 21, which has the inactive support surface 3 or 5 thereof facing outward situated in a plane parallel with the plane of the paper. In FIG. 7, it is seen that the cutting insert 1 is anchored in the milling body 21 by means of a center screw 23. In FIG. 7, the contour of a trigon insert is shown by dash-dotted lines, the dash-dotted line having been given the reference designation TR. By studying FIG. 7, it is realized that the cutting insert 1 according to the present invention has cutting corners/cutting edge areas corresponding to a trigon insert but sides/support surfaces corresponding to a triangular cutting insert. This means that the cutting insert 1 according to the present invention has stronger cutting corners/cutting edge areas than triangular cutting inserts. In FIG. 7, the wedge angle between the main cutting edge and the clearance surface is shown, said angle being designated β. The wedge angle β is in the range of 70°≦β≦85°, preferably in the range of 77°≦β≦83°. As is seen in FIG. 7, the clearance surface of the active cutting edge area forms an angle γ with the surface Y that is machined in the workpiece. This second clearance angle γ is in the range of 1°-10°, preferably in the range of 5°-7°.

The continuous support surfaces 11-13 that the cutting insert 1 according to the present invention has on each one of the sides S1-S3 entails that the cutting insert 1 according to the present invention obtains an exceptionally stable clamping/anchorage in the milling body 21.

Upon studying FIG. 7, it is also realized that the triangular basic shape of the cutting insert 1 according to the present invention entails that more material will be left around the insert seat of the milling body 21 as well as a simpler manufacture of the insert seat. The additional material has been designated M in FIG. 7.

The disclosures in Swedish patent application No. 0702766-7, from which this application claims priority, are incorporated herein by reference.

The invention claimed is:

1. Indexable milling insert having triangular shape, the cutting insert comprising a mounting hole placed centrally in the cutting insert, a first support surface and a second support surface, which support surfaces are parallel with each other and act as alternating support surfaces, that the cutting insert comprises three equally long sides, which extend between the parallel support surfaces, that the cutting insert is provided with main cutting edges, which are orientated perpendicularly to the center axis of the mounting hole as well as provided in such a way that a rotation of the cutting insert around the center of the mounting hole to an alternative insert seat alternatively a turning of the cutting insert to an alternative insert seat provides an identical location of the main cutting edges in relation to a piece to be machined, and that the wedge angles (β) of the cutting insert are in the range of 70°≦β≦85°, wherein the cutting insert comprises planar support surfaces situated on the sides, and that the support surfaces in the respective sides form mutual angles of 60°.

2. Milling insert according to claim 1, wherein the support surfaces extend along the major part of the length that the sides of the cutting insert define.

3. Milling insert according to claim 2, wherein each support surface comprises two elongate part surfaces as well as a connection portion, and the part surfaces are situated in a common plane.

4. Milling insert according to claim 3, wherein each part surface has an extension in the longitudinal direction of the associated side surface that is in the order of the length of half the side surface.

5. Milling insert according to claim 2, comprising six cutting edge areas, and that each cutting edge area comprises a main cutting edge, a minor cutting edge as well as an associated nose cutting edge.

6. Milling insert according to claim 5, wherein the minor cutting edge has an extension transverse to the main cutting edge.

7. Milling insert according to claim 5, wherein each minor cutting edge has a chamfer.

8. Milling insert according to claim 5, wherein each cutting edge area comprises a chip breaking recess.

9. Milling insert according to claim 1, wherein each support surface comprises two elongate part surfaces as well as a connection portion, and the part surfaces are situated in a common plane.

10. Milling insert according to claim 9, wherein each part surface has an extension in the longitudinal direction of the associated side surface that is in the order of the length of half the side surface.

11. Milling insert according to claim 1, comprising six cutting edge areas, and that each cutting edge area comprises a main cutting edge, a minor cutting edge as well as an associated nose cutting edge.

12. Milling insert according to claim 11, wherein the minor cutting edge has an extension transverse to the main cutting edge.

13. Milling insert according to claim 12, wherein each minor cutting edge has a chamfer.

14. Milling insert according to claim 11, wherein each minor cutting edge has a chamfer.

15. Milling insert according to claim 11, wherein each cutting edge area comprises a chip breaking recess.

16. Milling tool comprising a milling body having a plurality of insert scats, wherein each insert seat is configured to receive a milling insert according to claim 1 so that the milling inserts are tangentially mounted in the milling body.

17. Milling tool according to claim 16, wherein the insert seats generally are triangular in planar view.

* * * * *